(12) United States Patent
Ilch

(10) Patent No.: US 9,370,867 B2
(45) Date of Patent: Jun. 21, 2016

(54) PARALLEL ROBOT

(75) Inventor: Hartmut Ilch, Kehl (DE)

(73) Assignee: MAJATRONIC GMBH, Kehl-Goldscheuer (DE)

( * ) Notice: Subject to any disclaimer, the term of this patent is extended or adjusted under 35 U.S.C. 154(b) by 177 days.

(21) Appl. No.: 13/386,856

(22) PCT Filed: Aug. 4, 2010

(86) PCT No.: PCT/DE2010/000914
§ 371 (c)(1),
(2), (4) Date: Jan. 24, 2012

(87) PCT Pub. No.: WO2011/015189
PCT Pub. Date: Feb. 10, 2011

(65) Prior Publication Data
US 2012/0118097 A1    May 17, 2012

(30) Foreign Application Priority Data
Aug. 4, 2009    (DE) .................. 10 2009 035 992

(51) Int. Cl.
*B25J 19/00*    (2006.01)
*B25J 17/02*    (2006.01)
*B25J 9/00*    (2006.01)

(52) U.S. Cl.
CPC ............ *B25J 17/0266* (2013.01); *B25J 9/0078* (2013.01); *B25J 19/0029* (2013.01); *Y10T 74/20329* (2015.01)

(58) Field of Classification Search
CPC ............... B25J 19/0025; B25J 19/0029; B25J 19/0033; B25J 9/042
USPC ............... 74/490.01–490.03, 490.05–490.07; 901/15, 28
See application file for complete search history.

(56) References Cited

U.S. PATENT DOCUMENTS

| 4,732,525 A | 3/1988 | Neumann |
| 4,976,582 A | 12/1990 | Clavel |

(Continued)

FOREIGN PATENT DOCUMENTS

| DE | 102 31 724 | 2/2004 |
| EP | 250 470 A1 | 6/1987 |

(Continued)

OTHER PUBLICATIONS

International Preliminary Report on Patentability, PCT/DE2010/000914, Feb. 7, 2012.

*Primary Examiner* — William Kelleher
*Assistant Examiner* — Emily Cheng
(74) *Attorney, Agent, or Firm* — Shlesinger, Arkwright & Garvey, LLP

(57) ABSTRACT

An industrial robot with parallel kinematics comprises a robot base; a carrier element used to receive a gripper or a tool; an elongated hollow body, having a continuous cavity, which is moveably connected directly or indirectly to the robot base, with a hollow joint, having a continuous cavity, with several degrees of freedom, via which the elongated hollow body is moveably connected to the carrier element; and the cavity of the joint adjoins the cavity of the elongated hollow body, wherein the elongated hollow body cavity and the hollow joint cavity form a channel from the robot base to the carrier element, with at least one supply line for a gripper or a tool arranged on the carrier element, which at least one supply line is guided from the robot base to the carrier element through the cavity of the elongated hollow body and penetrates the hollow joint.

10 Claims, 11 Drawing Sheets

(56) References Cited

U.S. PATENT DOCUMENTS

| | | | |
|---|---|---|---|
| 4,988,259 A * | 1/1991 | Gabillet | B25J 9/06 294/192 |
| 5,740,699 A * | 4/1998 | Ballantyne | B25J 17/0266 403/120 |
| 6,301,525 B1 | 10/2001 | Neumann | |
| 6,330,837 B1 * | 12/2001 | Charles et al. | 74/490.06 |
| 6,723,106 B1 * | 4/2004 | Charles et al. | 606/130 |
| 6,840,127 B2 * | 1/2005 | Moran | 74/490.04 |
| 7,284,459 B2 * | 10/2007 | Bellouard | 74/490.01 |
| 7,299,713 B2 * | 11/2007 | Uematsu et al. | 74/490.02 |
| 7,331,253 B2 | 2/2008 | Burkert et al. | |
| 8,396,596 B2 * | 3/2013 | Oka et al. | 700/258 |
| 2001/0019692 A1 * | 9/2001 | Ehrat | 414/735 |
| 2004/0143876 A1 * | 7/2004 | Persson et al. | 901/1 |
| 2005/0103148 A1 * | 5/2005 | Inoue et al. | 74/490.02 |
| 2007/0113700 A1 * | 5/2007 | Khajepour et al. | 74/490.03 |
| 2008/0141813 A1 * | 6/2008 | Ehrat | 74/490.01 |
| 2009/0114052 A1 * | 5/2009 | Haniya et al. | 74/490.03 |
| 2009/0255363 A1 * | 10/2009 | Nishida et al. | 74/490.07 |
| 2009/0301253 A1 * | 12/2009 | Nishida et al. | 74/490.01 |
| 2010/0116081 A1 * | 5/2010 | Pistor et al. | 74/490.05 |

FOREIGN PATENT DOCUMENTS

| | | |
|---|---|---|
| EP | 1 424 161 B1 | 11/2003 |
| EP | 1 640 120 A1 | 3/2006 |
| EP | 1 768 174 A1 | 3/2007 |
| FR | 2 734 749 A1 | 12/1996 |
| JP | 2005 028558 | 2/2005 |

\* cited by examiner

C-C

PARALLEL ROBOT

FIELD OF THE INVENTION

The invention is based on an industrial robot with parallel kinematics, which is equipped with a robot base, with a carrier element used as a receptacle for a gripper or a tool and with several actuating units for moving the carrier element.

BACKGROUND OF THE INVENTION

Industrial robots of this type with parallel kinematics are used to move, position and/or process an object in space. They include Delta robots, for example. These are equipped with at least two control arms as actuating units. Each control arm has an upper and a lower arm section, which are connected to one another, a motor-gear unit. The drives are arranged on the robot base. The movement of th in a moveable manner. Each of the upper arm sections is driven by a drive, for example e upper arm sections is transferred via the lower arm sections to a carrier element. Each lower arm section has two parallel rods or struts running in the longitudinal direction of the arm section, which are moveably connected at their one end to the associated upper arm section and at their other end are moveably connected to the carrier element. For example, a gripper for picking up an object or a tool for processing an object can be arranged on the carrier element. To this end the carrier element is equipped with a receptacle for a gripper or a tool. The gripper or the tool arranged on the carrier element can be moved in several dimensions in a targeted manner by means of the movement of the driven upper arm sections coordinated with one another. The control arms effect a spatial parallelogram guidance of the carrier element. The parallel kinematics resulting therefrom render possible a rapid and precise movement of the carrier element and of the gripper or tool arranged thereon. A torque and/or a force can be transferred to the gripper or the tool by means of an additional transfer device arranged on the robot base. If the industrial robot is equipped with three control arms, the transfer device is referred to as a fourth axis.

In addition to Delta robots, industrial robots with parallel kinematics also include cable robots. Cable robots are equipped with cables as actuating units. Each cable is connected by its one end to a drive. The drives are embodied as rotation or linear drives which give the free length of the cables by winding and unwinding on a shaft connected to a cable end or by advancing or retracting a push rod connected to a cable end. At their end facing away from the drive, the cables are connected to a carrier element for a gripper or a tool. It must be ensured thereby that the cables are tensioned. The gripper or the tool arranged on the carrier element can be moved in several dimensions in a targeted manner by means of the movement of the drives coordinated with one another.

A gripper arranged on the carrier element or a tool arranged on the carrier element is actuated via a pneumatic, hydraulic or electric drive. For this purpose, the gripper or the tool is connected to the robot base via hydraulic, pneumatic, electric or optical supply lines, on which robot base the drive or a part of the drive for the actuation of the gripper or the tool is arranged. The supply lines are used for the transport of compressed air, a pressure liquid, electric current or light. Light can be necessary, for example, for a sensor arranged on the gripper or on the tool. The supply lines thereby connect the robot base to the carrier element freely and without guidance or they are guided along the actuating units or along the transfer device.

An industrial robot of this type with actuating units in the form of control arms is known, for example, from EP 250 470 A1.

Since industrial robots of this type are also used in the field of food production and food processing, they must satisfy high requirements in terms of hygiene, the harmlessness of materials from which the components of the industrial robot are made and the compatibility with the objects to be moved or processed. In particular the components of the industrial robot coming into contact with the objects must be regularly cleaned. It is important thereby that a cleaning fluid used for cleaning can flow around the components of the industrial robot. The cleaning of the supply lines in particularly has thereby proven to be disadvantageous. If they are guided along the actuating units or the transfer device, dirt can collect in the gaps between the supply lines and the actuating units or the transfer device, which is difficult to access for a cleaning. Furthermore, special demands are made on the supply lines, in particular on their coating or covering with regard to its harmlessness with respect to the objects processed with the industrial robot. Finally, there is a risk of the supply lines being damaged during cleaning.

SUMMARY OF THE INVENTION

The object of the invention is to provide an industrial robot with parallel kinematics, which renders possible a reliable cleaning of all components, in which damage to the supply lines is avoided and in which no special demands are made on the material of the supply lines.

This object is attained through an industrial robot equipped with at least one elongated hollow body, which is connected directly or indirectly to the robot base. The elongated hollow body has a continuous cavity running in the longitudinal direction. Furthermore, the elongated hollow body is connected in a moveable manner to the carrier element via a joint embodied in an internally hollow manner with several degrees of freedom. The cavity of the hollow joint thereby adjoins the cavity of the elongated hollow body and forms a channel from the robot base to the carrier element. The supply lines are guided from the robot base to the carrier element through the cavities of the elongated hollow body and of the hollow joint. They are thus protected on the one hand from contamination and soiling and on the other hand from damage. The elongated hollow body or hollow bodies are open on the front faces but otherwise preferably closed, so that contaminants and cleaning fluids cannot penetrate into the elongated hollow body from outside and particles such as wear debris of the supply lines, for example, cannot penetrate to the outside. The supply lines are thus protected from outside influences. Moreover, the objects to be processed are protected from contaminants by the supply lines. Furthermore, compared to a guidance of the supply lines along the actuating units, the supply lines guided in the elongated hollow body and the hollow joint are subjected to wear to a much lower extent, since even with a deflection of the carrier element from the starting position, they run virtually in a straight line or curved by only a small angle.

The elongated hollow body can have as components, for example, at least two tubes that can be displaced within one another in a telescoping manner. These are supported inside one another secured against twisting. For this purpose, the tubes can have a circular cross section. An inner tube is thereby equipped with bosses projecting outwards, while the outer tube has grooves that are adapted to the bosses. Bosses and grooves run in the longitudinal direction of the tubes. Furthermore, the tubes can also have a cross section that deviates from a circular shape, for example, an oval or angular cross section. The elongated hollow body comprising at least two tubes arranged inside one another in a telescoping manner has the advantage that it is variable in its length and adapts to the variable distance between the robot base and the carrier element. The distance between the robot base and the carrier element changes with a movement of the actuating units. Furthermore, large torques can be transferred even by tubes with a low weight. However, there is also the possibility of using flexible drive shafts as elongated hollow bodies. These are likewise embodied as hollow bodies and can thus accommodate the supply lines. Furthermore, the elongated hollow body can have only one rigid tube. In order to take into account the variable distance between the robot base and the carrier element, the tube can be displaceably supported on the robot base.

The cavity of the joint adjoins the continuous cavity of the elongated hollow body. The internally hollow joint has several joint parts, which are moveable relative to one another. These ensure several degrees of freedom of the joint, so that the elongated hollow body connected via the joint to the carrier element can follow the movement of the carrier element. The carrier element is moved in a three-dimensional manner in space via the actuating units. The joint must therefore permit at least a movement in two dimensions. A movement with respect to a third dimension is rendered possible, for example, by a displaceable arrangement in the longitudinal direction of the elongated hollow body on the robot base or by a variable-length embodiment of the elongated hollow body. The joint parts preferably have a continuous cavity or are arranged around a cavity. If the joint parts are arranged inside one another, such as, for example, with a homokinetic joint or a constant velocity joint, the innermost joint part has a cavity through which the supply line is guided. The other joint parts are arranged around the innermost joint part and do not constrict the cavity. If the joint parts are arranged one after the other, such as, for example, with a universal joint or cardan joint with a central joint part and with fork-like joint parts attached thereto in various directions, the cavities of the individual joint parts adjoin one another. Joint parts that connect the joint to the elongated hollow body and to the carrier element or to a gripper or tool arranged on the carrier element, are likewise embodied in a hollow manner or arranged around a cavity so that a continuous cavity common to all joint parts is produced or a sequence of cavities arranged one behind the other, which in turn in total produce a common continuous cavity of all joint parts for the supply lines. In the starting position of the joint, in which the joint is not deflected, this continuous cavity runs in the axial direction. In this starting position the joint can connect two virtual shafts aligned in a parallel manner. The two shafts are aligned offset to one another only through the deflection of the joint. In the case of the joint connected to the elongated hollow body, the axial direction of the joint corresponds to the longitudinal direction of the elongated hollow body and of the cavity of the elongated hollow body. In this starting position the elongated hollow body is aligned vertically.

The elongated hollow body with the joint on its end facing towards the carrier element can have various functions:

Firstly, it accommodates the supply lines for a gripper or a tool arranged on the carrier element and guides them from the robot base to the carrier element, on which a tool or a gripper is arranged. Advantageously, the cavity runs in the axial direction in the joint. If the supply lines can be laid in the axial direction along the axis of rotation, no torque or at most only a very low torque, will act thereon.

Secondly, it can transmit a torque of a rotation drive arranged on the robot base to a gripper arranged on the carrier element or to a tool arranged on the carrier element. In this case, the elongated hollow body is embodied as a torque transmission device and is connected to the carrier element in a rotatable manner, so that the torque is transmitted to a gripper or a tool on the carrier element, not to the carrier element. For this purpose, the carrier element is preferably equipped with a hollow shaft, which is arranged on the carrier element in a rotatable manner. The elongated hollow body is connected via the joint and the hollow shaft of the carrier element to a tool or to a gripper. In order to ensure an exact positioning and alignment of a gripper or tool arranged on the carrier element, it is essential that the elongated hollow body as well as the joint render possible exact angles of rotation.

Thirdly, as a force transmission device, it can transmit a force in the longitudinal direction to the carrier element or a gripper arranged on the carrier element or a tool arranged on the carrier element, and thereby press either the carrier element, the gripper or the tool in a direction opposite to the robot base. In order to perform this function, the industrial robot is equipped with a drive or actuator, for example, a pneumatic cylinder or a linear drive, for example, an electric motor, to generate forces acting axially. This drive or actuator can also be arranged in the elongated hollow body. The elongated hollow body and the joint must be rigid and must not undergo any deformation under the forces generated. Axially acting forces of this type are important in particular with cable robots, in which the cables are tensioned in this manner.

In a preferred manner the elongated hollow body does not penetrate the robot base and the carrier element. On its end facing towards the robot base, the elongated hollow body is moveably arranged on the side of the robot base facing towards the carrier element. For this purpose, a hollow joint can likewise be provided, through which the supply lines are guided. Furthermore, the elongated hollow body is moveably connected via a hollow joint to the carrier element on the side of the carrier element facing towards the robot base.

According to an advantageous embodiment, the joint has several joint parts that are moveable relative to one another, of which a first joint part is connected to the elongated hollow body and of which a second joint part is connected to the carrier element or to a tool or gripper arranged on the carrier element. The first and the second joint part are thereby moveably connected to one another. The first joint part and the second joint part are equipped with a cavity and/or arranged around a cavity so that a common continuous cavity or a spatial sequence of continuous cavities arranged one behind the other is given. The cavities arranged one behind the other likewise produce in sum a common cavity of all joint parts. The supply lines are guided through this common cavity of the joint parts.

According to a further advantageous embodiment of the invention, the first joint part and the second joint part are connected to one another via at least a third joint part. The at least one third joint part is thereby equipped with a cavity and/or arranged around a cavity. This cavity of the third joint part together with the cavities of the first and second joint parts forms a common continuous cavity of the joint, through which the supply lines are guided.

According to a further advantageous embodiment of the invention, the joint is a cardan joint, which has a central tubular or annular joint part equipped with crossed axles or pairs of axle stubs. A cardan joint is also referred to as a universal joint due to the intersecting axles. The central annular or tubular joint part, according to the above distinction between a first, second and third joint part, can be a third joint part, which has a continuous cavity. The annular or tubular joint part can be round or angular in cross section. A first axle or a first pair of axle stubs of the crossed axles runs through the central joint part with its rotational axis and is supported in or on a first joint part connected to the elongated hollow body. A second axle or a second pair of axle stubs of the crossed axles likewise runs through the central joint part with its rotation axis and is supported in or on a second joint part connected to the carrier element. As a first joint part, for example, tongue-shaped axle receptacles can be arranged on the elongated hollow body, which project in the longitudinal direction on the elongated hollow body. The same applies to the second joint part with respect to the carrier element. The first joint part can be embodied in one piece with the elongated hollow body or as a separate component that is connected to the elongated hollow body. Likewise, the second joint part can be embodied in one piece with the carrier element or connected to the carrier element as a separate element.

According to a further advantageous embodiment of the invention, the joint is a cardan joint or universal joint, which has at least two rings or tubes as joint parts. These rings or tubes are rotatably connected to one another via crossed axles and to the elongated hollow body and/or the carrier element. Thus, for example, the elongated hollow body can be rotatably connected about a first axis at its end facing towards the carrier element to a first ring, wherein the first axis is aligned perpendicular to the longitudinal direction of the elongated hollow body. The first ring can be arranged in a rotatable manner, for example, inside the elongated hollow body. According to the above distinction between the first and second joint part, the first ring corresponds to the first joint part. Inside this first ring, a second ring is rotatably arranged about a second axis on the first ring. The first and second axes thereby intersect. The second ring is connected to the carrier element. According to the above distinction between the first and second joint part, it corresponds to the second joint part. The first ring can also be arranged on the outside of the elongated hollow body. The rings or tubes preferably have a round cross section.

According to a further advantageous embodiment of the invention, the joint is a constant velocity joint, in which the inner joint part has a continuous cavity, which penetrates the joint part completely. The other joint parts are arranged around the inner joint part. Constant velocity joints are also referred to as homokinetic joints.

According to a further advantageous embodiment of the invention, the carrier element is equipped with a hollow shaft rotatably supported in the carrier element. The hollow shaft is connected at its end facing towards the elongated hollow body to the hollow joint and at its end facing away from the elongated hollow body to a tool or gripper.

According to an advantageous embodiment of the invention, the industrial robot is equipped with a second joint, embodied in an internally hollow manner, with several degrees of freedom, via which the elongated hollow body is connected to the robot base or to a drive arranged on the robot base. The supply lines are thereby guided through the second joint. The supply lines are thus also completely shielded from the outside at the transition from the elongated hollow body to the robot base. The second joint, like the first joint arranged between the carrier element and the elongated hollow body, has several joint parts that are moveable relative to one another. Furthermore, the second joint can be embodied, for example, as a cardan joint or a constant velocity joint. The above statements on the first joint apply analogously.

According to a further advantageous embodiment of the invention, the elongated hollow body together with the joint or joints is embodied at its ends as a jointed shaft with length compensation for transmitting torques from a rotation drive arranged on the robot base to a gripper arranged on the carrier element or to a tool arranged on the carrier element.

According to a further advantageous embodiment of the invention, the at least one elongated hollow body is rigid. In this manner no deformation of the elongated hollow body takes place. Furthermore, forces can be transmitted to the carrier element or to a gripper or a tool arranged on the carrier element through the elongated hollow body by means of an additional drive.

According to a further advantageous embodiment of the invention, at least one pneumatic or hydraulic control element is arranged in the elongated hollow body for actuating a gripper or tool arranged on the carrier element. A control element of this type comprises one or more valves, for example. Due to the position in the elongated hollow body, the control element is located closer to a gripper or tool than with a positioning of the control element on the robot base. The closer the pneumatic or hydraulic control is arranged to the gripper or the tool, the shorter the distance the compressed air or a pressure liquid has to cover to move the gripper or the tool from the control to the gripper or to the tool. This leads to short reaction times. The valves of the pneumatic or hydraulic control are triggered by electrical signals, the propagation speed of which is much higher than the speed of compressed air or of a pressure liquid. The elongated hollow body shields the pneumatic or hydraulic control from the outside and serves as a housing. The elongated hollow body thus prevents the pneumatic or hydraulic control from being able to come into contact with the objects to be moved or processed. The control therefore does not need to meet any special requirements regarding hygiene.

According to a further advantageous embodiment of the invention, the supply line arranged in the elongated hollow body is wound up at least in some sections in a screw-shaped or spiral-shaped manner. It can thus follow the length adjustment of the device. The screw-shaped or spiral-shaped winding is drawn apart with an enlargement of the distance between the robot base and the carrier element and compressed with a shortening of the distance. The winding is thereby preferably around the central longitudinal axis of the elongated hollow body. The diameter of the winding is thereby preferably smaller than the inner diameter of the elongated hollow body.

The object is furthermore attained through the industrial robot characterized in that it is equipped with at least one actuating unit embodied in a hollow manner. This actuating unit in the form of a control arm has an upper and a lower arm section with respectively one continuous cavity. Furthermore, the actuating unit is equipped with a joint between the two arm sections, which has a continuous cavity. The joint between the lower arm section and the carrier element likewise has a continuous cavity. The cavities of the arm sections and of the joints thereby adjoin one another and form a continuous channel from the robot base to the carrier element. In these continuous cavities at least one supply line is arranged and guided from the robot base to the carrier element. The supply line is thereby protected from contamination and soiling and on the other hand from damage. The arm sections and the joints of the hollow actuating unit are open at the front faces, but otherwise preferably closed so that contamination and cleaning fluids cannot penetrate into the elongated hollow body from outside and particles such as wear debris from the supply lines cannot penetrate to the outside. The supply lines are thus protected against external influences. Moreover, the objects to be processes are protected from contamination by the supply lines. Furthermore, compared to a guidance of the supply lines along the actuating units, the supply lines guided in the at least one hollow actuating unit are subjected to wear to a much lower extent.

According to an advantageous embodiment of the invention, the upper arm section of the hollow actuating unit is embodied as a hollow body. The lower arm section has at least one hollow body. Typically, the lower arm section is composed of two tubes arranged in a parallel manner. It is sufficient thereby if one of the two tubes is a hollow body.

According to a further advantageous embodiment of the invention, the hollow joint is a cardan joint, which has a central tubular or annular joint part equipped with crossed axles or pairs of axle stubs. A first axle or a first pair of axle stubs is supported in or on a first joint part connected to an arm section. A second axle or a second pair of axle stubs is supported in or on a second joint part connected to the other arm section or to the carrier element. The first and second joint parts are likewise embodied as hollow bodies. They can furthermore be embodied in one piece with the associated arm section or carrier element.

According to a further advantageous embodiment of the invention, the hollow joint is a cardan joint, which as joint parts has two rings or tubes, which are rotatably connected to one another via crossed axles. One of the two rings or tubes is connected to an arm section and the other ring or the other tube is connected to the other arm section or to the carrier element.

According to a further advantageous embodiment of the invention, the joint (71, 72) is a constant velocity joint, in which the inner joint part has a cavity. This cavity penetrates the inner joint part completely.

Further advantages and advantageous embodiments of the invention are shown by the following description, the drawing and the claims.

BRIEF DESCRIPTION OF THE DRAWINGS

The drawing shows an exemplary embodiment of the invention and is described in further detail below. They show.

DESCRIPTION OF THE EXEMPLARY EMBODIMENT

Figure 1:
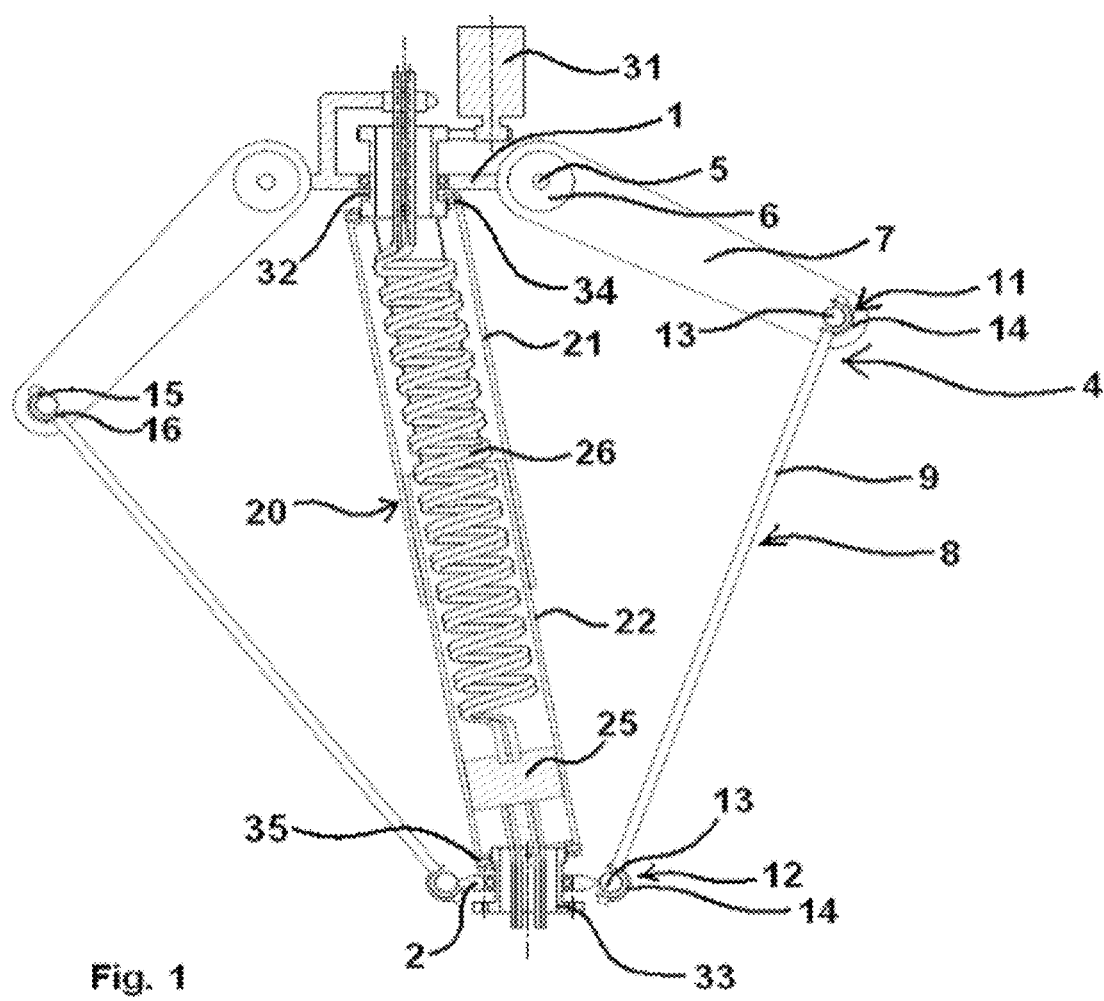
FIG. 1 first exemplary embodiment of an industrial robot according to the Delta principle in sectional representation, FIG. 2 industrial robot according to FIG. 1 without gripper, with actuating units shown diagrammatically and with vertically aligned elongated hollow body, FIG. 3 industrial robot according to FIG. 1 without gripper, with actuating units shown diagrammatically and with elongated hollow body deflected from the vertical, FIG. 4 joint of the industrial robot according to FIG. 1 in sectional representation, FIG. 5 section through the elongated hollow body of the industrial robot according to FIG. 1 along the plane designated A-A in FIG. 2, FIG. 6 section through the elongated hollow body of the industrial robot according to FIG. 1 along the plane designated B-B in FIG. 2, FIG. 7 section through the elongated hollow body of the industrial robot according to FIG. 1 along the plane designated C-C in FIG. 2, FIG. 8 lower arm section of an actuating unit of the industrial robot according to FIG. 1 in perspective representation, FIG. 9 second exemplary embodiment of an industrial robot with cables as actuating units in perspective representation, FIG. 10 industrial robot according to FIG. 9 in longitudinal section, FIG. 11 third exemplary embodiment of an industrial robot with cables as actuating units in longitudinal section, FIG. 12 universal joint for an industrial robot according to FIGS. 1, 9 and 11 in various views, FIG. 13 fourth exemplary embodiment of an industrial robot in longitudinal section.
Figure 4:
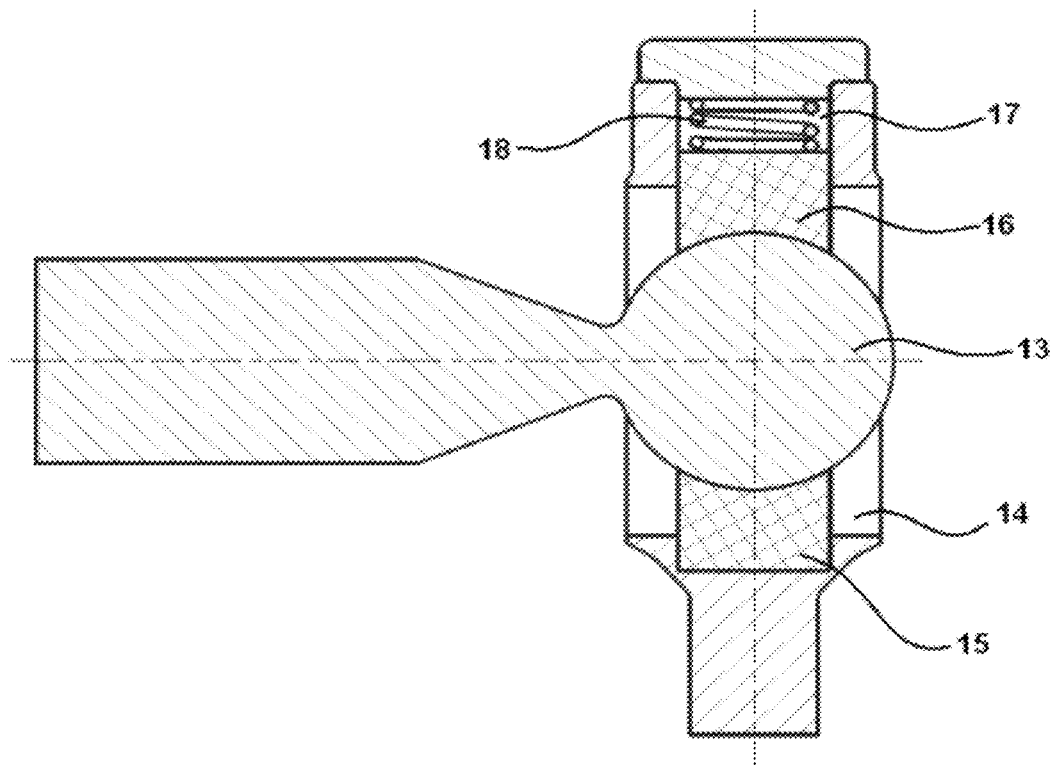

FIG. 1 shows a first exemplary embodiment of an industrial robot according to the Delta principle with a robot base 1, a carrier element 2, on which a gripper or a tool can be arranged, and two actuating units 4 embodied as control arms. The gripper and the tool are not shown in the drawing. The industrial robot has a total of three actuating units 4 embodied as control arms, but one of the actuating units cannot be seen in the representation. Each of the three actuating units is connected to a motor 6 via a drive shaft 5. The actuating units 4 have an upper arm section 7 and a lower arm section 8. The upper arm section 7 is thereby characterized by high stability and low weight. The lower arm section 8 has two rods 9 and 10 running in a parallel manner. In the drawing in each case only one of the two rods of an actuating unit 4 is discernible. The two rods 9 and 10 of the lower arm section 8 of an actuating unit 4 are connected via joints 11 at their upper end to the upper arm section 7 of the actuating unit 4 and via joints 12 to the carrier element 2. The joints 11 coincide with the joints 12. A joint of this type is shown in section in FIG. 4. Each of the joints 11 and 12 has a spherical joint head 13. This joint head is arranged on the upper arm section 7 with the joints 11 and on the carrier element 2 with the joints 12. For this purpose, a connection piece is provided on the joint head 13. Furthermore, the joints 11 and 12 have a ring 14 in which two cylindrical receiving members 15 and 16 are arranged. For better clarity of the drawing, the ring is shown only in part in FIG. 1. It can be closed or have an opening as in FIG. 1. The two receiving members 15 and 16 have on their front face facing towards the spherical joint head a shape that represents part of a ball cup. The radius of this ball cup is adapted to the radius of the spherical joint head 13. The receiving member 15 is rigidly arranged in the ring 14. The receiving member 16 is guided in a displaceable manner in a receptacle 17 in the radial direction based on the radius of the spherical joint head 13. It is pressed against the spherical joint head 13 via a coil spring 18. Instead of a coil spring, a disk spring can also be used for this purpose. Manufacturing tolerances of the joint head 13, the receiving members 15 and 16 and a wear of the respective parts can be compensated via the receiving member 16 displaceably guided in the receptacle 17 and the force applied to the receiving member 16 via the coil spring 18. This ensures that the joint head is supported in the receiving members in a moveable manner and without play. The joint head 13 and the two receiving members 15 and 16 are embodied with respect to their material and their surfaces such that the receiving members 15 and 16 can move relative to the joint head 13 and thereby slide along the surface of the joint head 13. Only slight friction occurs hereby, which minimizes wear. Due to the joints 11 and 12, the lower arm sections 8 can rotate relative to the upper arm sections 7 as well as relative to the carrier element 2. In order to thereby avoid a rotation of the rods 9 and 10 about their longitudinal axis, the two rods 9 and 10 of a lower arm section 8 are connected to one another via bridge element 19. The bridge elements 19 are composed of a rigid material. However, they are connected to the two rods 9 and 10 in a moveable manner.

Figure 5:
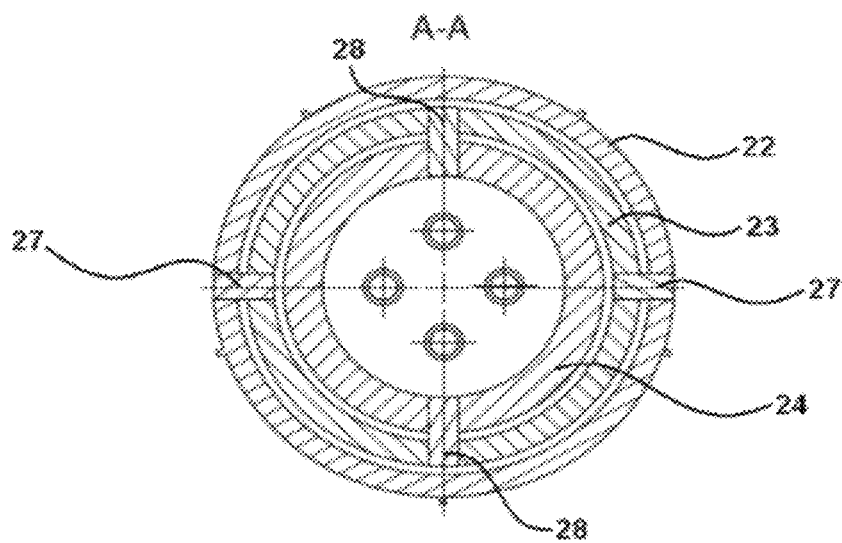

The industrial robot is furthermore equipped with an elongated hollow body 20. It is used to transmit a torque of a rotation drive 31 arranged on the robot base 1 to a gripper (not shown in the drawing) or a tool (not shown) on the carrier element. The elongated hollow body 20 has two tubes 21 and 22 that can be displaced inside one another in a telescoping manner. Due to the displaceable bearing, changes in distance between the robot base 1 and the carrier element 2 during a movement of the actuating units 4 can be equalized. The upper tube 21 is connected to the robot base 1 via a first cardan joint 34 in a moveable manner. The first cardan joint 34 has two rings 23 and 24, which are arranged in a rotatable manner about axles 27 and 28 running perpendicular to one another. The first ring 23, the second ring 24, the first axle 27 and the second axle 28 are discernible in the sectional representation according to FIG. 7. The lower tube 22 of the elongated hollow body 20 is moveably connected to the carrier element 2 via a corresponding second cardan joint 35. This is shown in FIG. 5. By means of the two cardan joints 34, 35, the elongated hollow body 20, adjustable in length, can follow a deflection of the carrier element 2 relative to the robot base 1 from the starting position shown in FIGS. 1 and 2. A deflection of this type is shown in FIG. 3.

The robot base 1 is equipped with a first hollow shaft 32 rotatably supported on the robot base 1. The end of the first hollow shaft 32 facing away from the elongated hollow body 20 is connected to the rotation drive 31. The end of the first hollow shaft 32 facing towards the elongated hollow body 20 is connected to the first cardan joint 34. The first hollow shaft 32 ensures that the torque is transmitted through the robot base to the elongated hollow body 20. Furthermore, the carrier element 2 is equipped with a second hollow shaft 33 rotatably supported on the carrier element. The end of the second hollow shaft facing towards the elongated hollow body 20 is connected to the second cardan joint 35. The end facing away from the hollow body 20 can be connected to a gripper or tool (not shown in the drawing). The two hollow shafts 32, 33 are embodied in a tubular manner and have a continuous cavity in the axial direction, through which the supply lines are guided. Due to the two hollow shafts 32 and 33, the elongated hollow body 20 can be rotated with respect to the robot base as well as with respect to the carrier element. The elongated hollow body 20 does not penetrate the robot base 1 and the carrier element 2. It extends merely from the side of the robot base 1 facing towards the carrier element 2 to the side of the carrier element 2 facing towards the robot base 1.

A valve control 25 with several valves for the pneumatic or hydraulic control of a gripper or tool is arranged in the tubes 21 and 22 of the elongated hollow body 20. Furthermore, the supply lines 26 for the supply and discharge of compressed air or pressure liquid to the valve control 25 and the gripper or tool are arranged in the tubes 21 and 22 of the adjustable-length device 20. In order for the supply lines 26 to be able to follow a change in length of the adjustable-length device 20, the supply lines are wound in in helical manner. With a change in length of the elongated hollow body 20, the coils of the helical winding are drawn apart or compressed.

Figure 2:
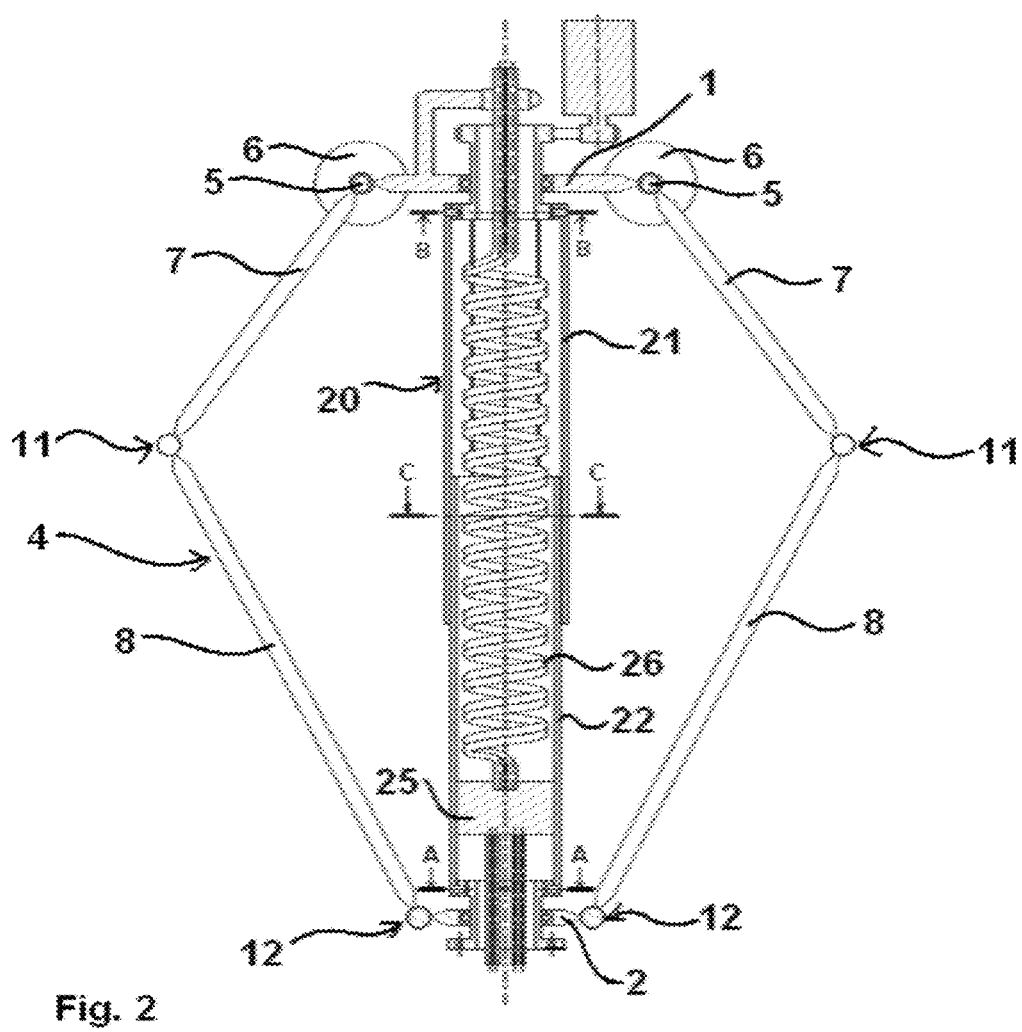
Figure 3:
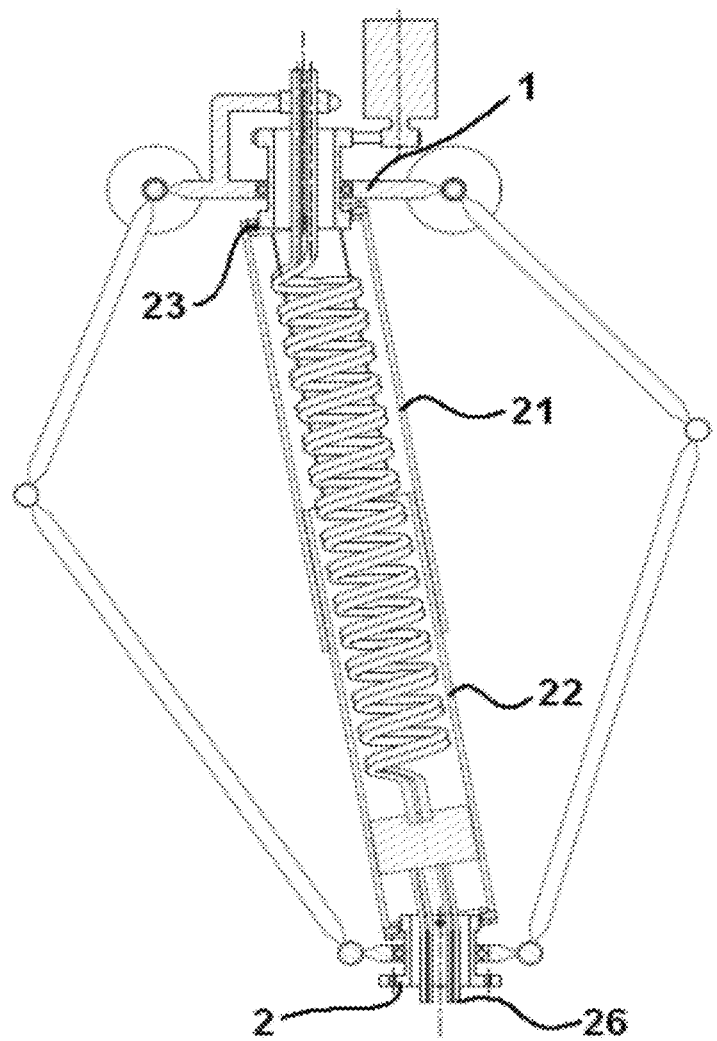

FIGS. 2 and 3 show the Delta robot in longitudinal section similar to FIG. 1, but in contrast to FIG. 1 the robot base 1, the carrier element 2 and the actuating units 4 are shown only diagrammatically. FIGS. 2 and 3 show primarily the alignment of the variable-length elongated hollow body 20. FIG. 2 thereby shows the starting position, in which the carrier element 2 is located directly under the robot base 1 and the elongated hollow body 20 with its two tubes 21 and 22 is aligned vertically in the longitudinal direction. FIG. 3 in contrast shows a position of the carrier element 2 deflected from this starting position, which is triggered by a movement of the actuating units 4. Although the deflection shown of the carrier element 2 does not lead to an extension of the elongated hollow body 20, it does lead to a tilting by an angle of 15° with respect to the vertical alignment shown in FIG. 2. Due to the cardan joints 34 and 35 with the rings 23 and 24 on the lower and upper end of the adjustable-length elongated hollow body 20, the tilting is possible without the robot base 1 and the carrier element 2 thereby changing their alignment with respect to the horizontal or vertical. The supply lines 26 are composed of a flexible material. They can therefore follow the movement of the adjustable-length elongated hollow body 20 relative to the robot base 1 and to the carrier element 2. For example, they are curved with the transition from the lower rube 22 to the carrier element 2.

FIG. 5 shows a cross section through the elongated hollow body 20 at the lower end of the tube 22 of the elongated hollow body 20 in the region of the second cardan joint 35. In the sectional representation, the two rings 23 and 24 of the cardan joint 35 are discernible. The first ring 23 is thereby rotatably connected to the tube 22 via a first axle 27. Furthermore, the second ring 24 is connected to the first ring 23 via a second axle 28. On the outside of the tube 22 the bosses 30 running in the longitudinal direction are discernible, which are used for securing against twisting between the tube 21 and the tube 22.

Figure 6:
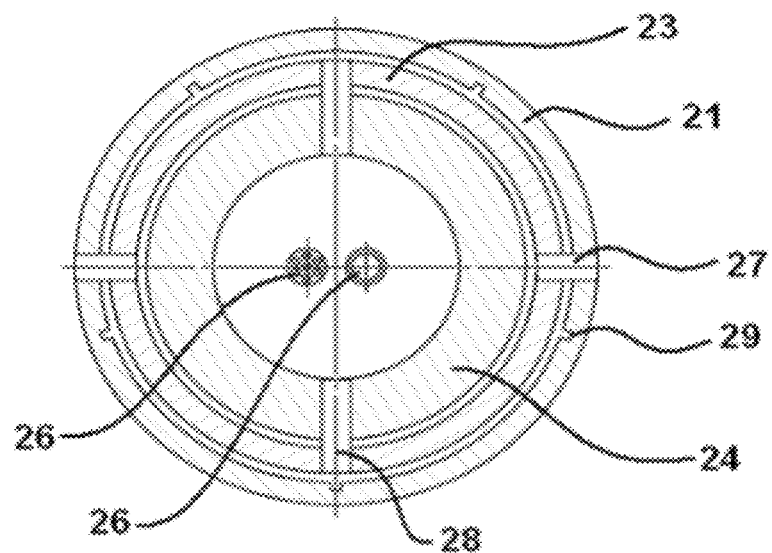

FIG. 6 shows a corresponding cross section through the elongated hollow body 20 at the upper end of the tube 21 in the region of the first cardan joint 34. In the sectional representation, the two rings 23 and 24 of the cardan joint 34 are discernible. The first ring 23 is thereby rotatably connected to the tube 21 via a first axle 27. Furthermore, the second ring 24 is connected to the first ring 23 via a second axle 28. Since the two cardan joints 34 and 35 are designed in an identical manner, the rings and the axles have the same reference numbers. On the inside of the tube 21, the grooves 29 running in the longitudinal direction are discernible, which are used for securing against twisting between the tube 21 and the tube 22.

Figure 7:
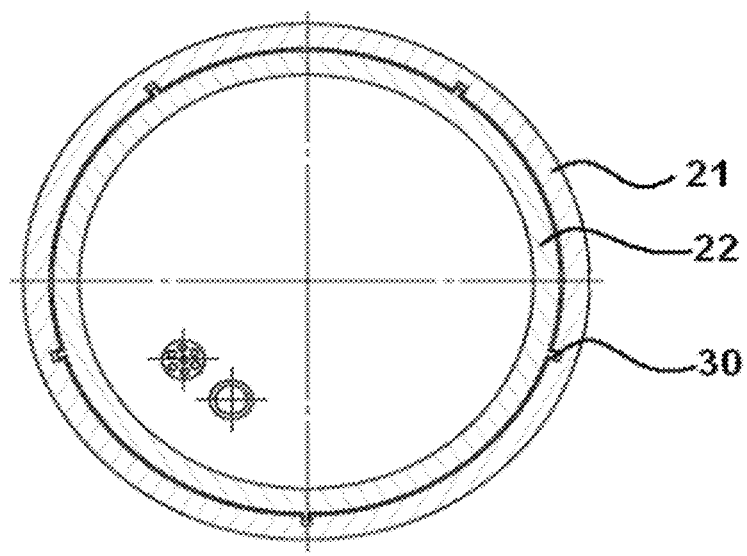

FIG. 7 shows the elongated hollow body 20 in cross section in the region in which the two tubes 21 and 22 overlap. In this representation the bosses 30 projecting outwards are discernible on the outside of the tube 22, which engage in the grooves 29 of the tube 21. Grooves 29 and bosses 30 together form the securing against twisting which prevents the tube 21 and the tube 22 from being able to rotate relative to one another. In the sectional representations according to FIGS. 5, 6 and 7, moreover, the supply lines 26 are discernible.

Figure 8:
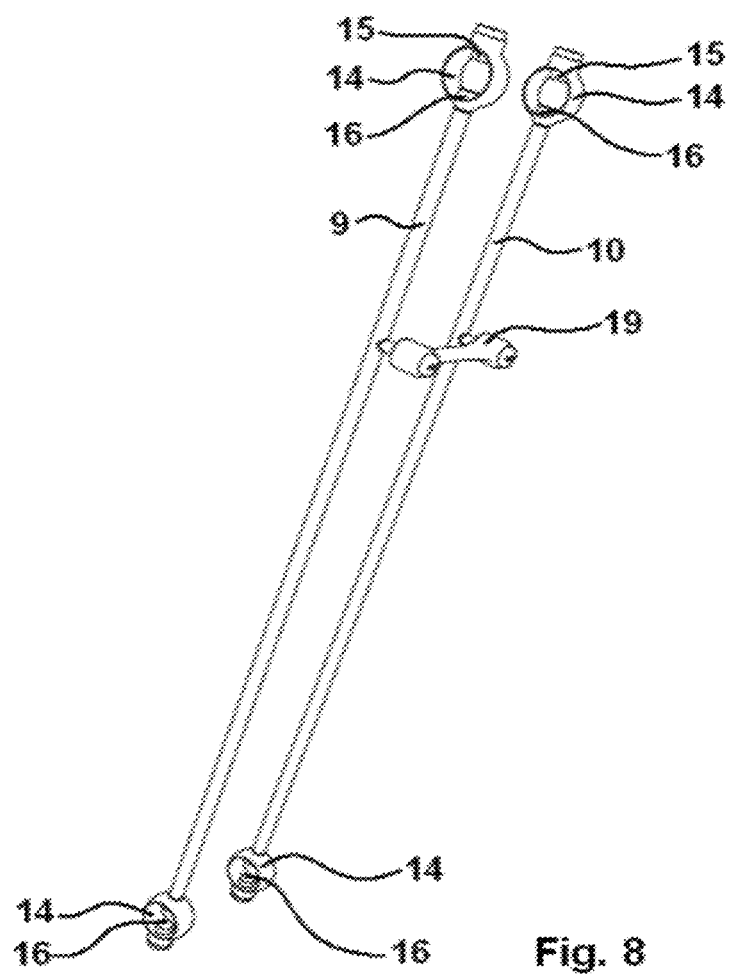

FIG. 8 shows a lower arm section 8 of an actuating unit 4 in perspective representation. The lower arm section has the two rods 9 and 10, which are equipped with parts of the joints on their upper and lower end and with the bridge element 19. The bridge element connects the two rods 9 and 10 to one another. The rings 14 with the receiving members 15 and 16 are arranged at the upper and lower ends of the rods 9 and 10 as parts of the joints. The spherical joint heads 13 of the joints 11 and 12 are arranged on the upper arm sections and on the carrier element 2. The joint heads 13 are discernible in FIGS. 1 and 4.

Figure 9:
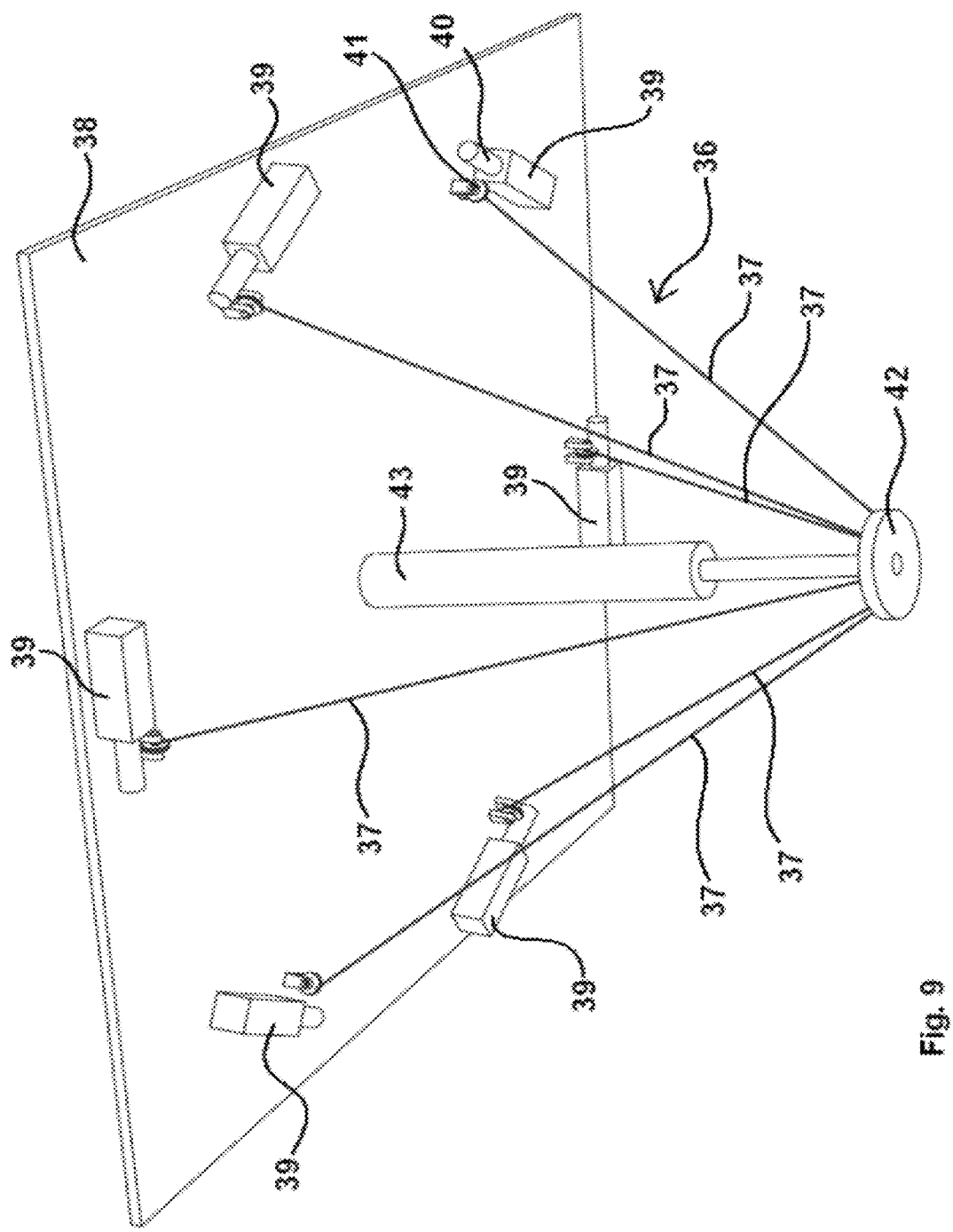
Figure 10:
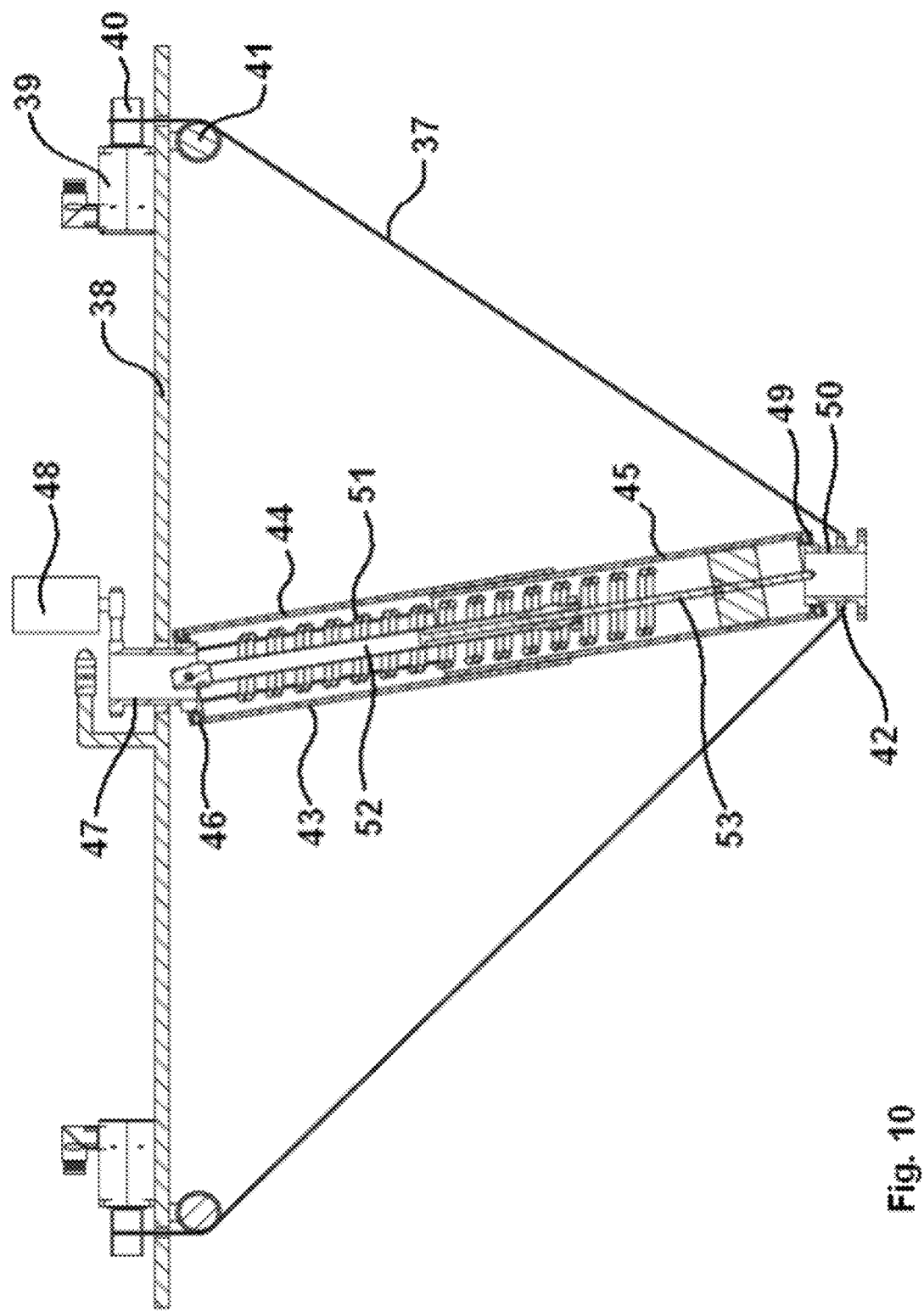

FIGS. 9 and 10 show a second exemplary embodiment of an industrial robot, in which, in contrast to the first exemplary embodiment, the actuating units 36 have cables 37. A total of six rotation drives 39 are arranged on a robot base 38. In the representation according to FIG. 9, the rotation drives 39 are located on the underside of the robot base 38. In the representation according to FIG. 10, the rotation drives 39 are located on the top of the robot base 38. A cable 37 is attached with its one end to a shaft 40 of a rotation drive 39. The cable 37 is wound on the shaft 40 or unwound from the shaft depending on the rotational direction of the associated rotation drive 39. The cable 37 is guided via a roll 41 arranged likewise on the robot base 38. With its lower end, the cable is fastened to a carrier element 42. A gripper or a tool can be arranged on the carrier element 42. Gripper and tool are not shown in the drawing. An elongated hollow body 43 is arranged between the robot base 38 and the carrier element 42. The total of six rotation drives 39 are controlled and release a certain cable section via a control, not shown in the drawing. The carrier element 42 is pressed downwards by the elongated hollow body 43 and thus tensions the cables 37. A movement of the carrier element 42 in space is thus carried out by means of the rotation drives 39 coordinated with one another, the cables 37 and the elongated hollow body 43.

The elongated hollow body 43 has two tubes 44 and 45 arranged in a telescoping manner which overlap in a central section. How far the two tubes overlap depends on the distance between the robot base 38 and the carrier element 42. A pneumatic cylinder 52 with a piston rod 53 is arranged in the elongated hollow body. Via this pneumatic cylinder a force is applied acting in the axial direction of the elongated hollow body, with which force the elongated hollow body 43 presses the carrier element 42 downwards in a direction opposite to the robot base 38. The rotation drives 39 of the cables 37 in turn apply a force acting in the opposite direction to the carrier element 42. The pneumatic cylinder 52 thus tends to draw the two tubes 44 and 45 apart, while the rotation drives 39 of the cables 37 compress the tubes 44 and 45. The elongated hollow body 43 is connected at its upper end via a first cardan joint 46 to a first hollow shaft 47 arranged rotatably in the robot base 38. Due to the first cardan joint 46, the elongated hollow body 43 is connected to the robot base 38 in a movable manner in several directions. A first hollow shaft 47 on the robot base 38 forms the connection between the first cardan joint 46 and a rotation drive 48 arranged on the robot base 38. The torque of the rotation drive is transmitted via the first hollow shaft 47, the first cardan joint 46, the elongated hollow body 43, a second cardan joint 49 and a second hollow shaft 50 to a tool, not shown in the drawing, or a gripper, not shown in the drawing either, on the second hollow shaft 50 of the carrier element 42. The second cardan joint 49 is located at the lower end of the elongated hollow body 43. Due to the second cardan joint 49, the elongated hollow body 43 is connected to the carrier element 42 in a moveable manner in several directions. The two cardan joints 46 and 49 ensure that the elongated hollow body 43 can follow the movements of the carrier element 42 triggered by the actuating units 36.

The elongated hollow body 43, the cardan joints 46, 49 and the hollow shafts 47 and 50 coincide essentially with those of the first exemplary embodiment. They are all equipped with a continuous cavity, wherein each cavity of a component adjoins the cavity of the adjacent component. In this manner a continuous cavity is produced from the side of the robot base 38 facing away from the carrier element to the side of the carrier element 42 facing away from the robot base, in which cavity supply lines 51 are arranged shielded from the outside. The supply lines 51 are wound in a helical manner in sections in the elongated hollow body.

In order to able to apply a force acting in the axial direction to the carrier element 42, the elongated hollow body is equipped with a pneumatic cylinder 52. The pneumatic cylinder is arranged in the hollow body 43 and partially surrounded by the winding of the supply lines 51. This is therefore an inner actuator. The pneumatic cylinder is moveably connected to the first hollow shaft 47. The piston rod 53 is moveably connected to the second hollow shaft 50.

Figure 11:
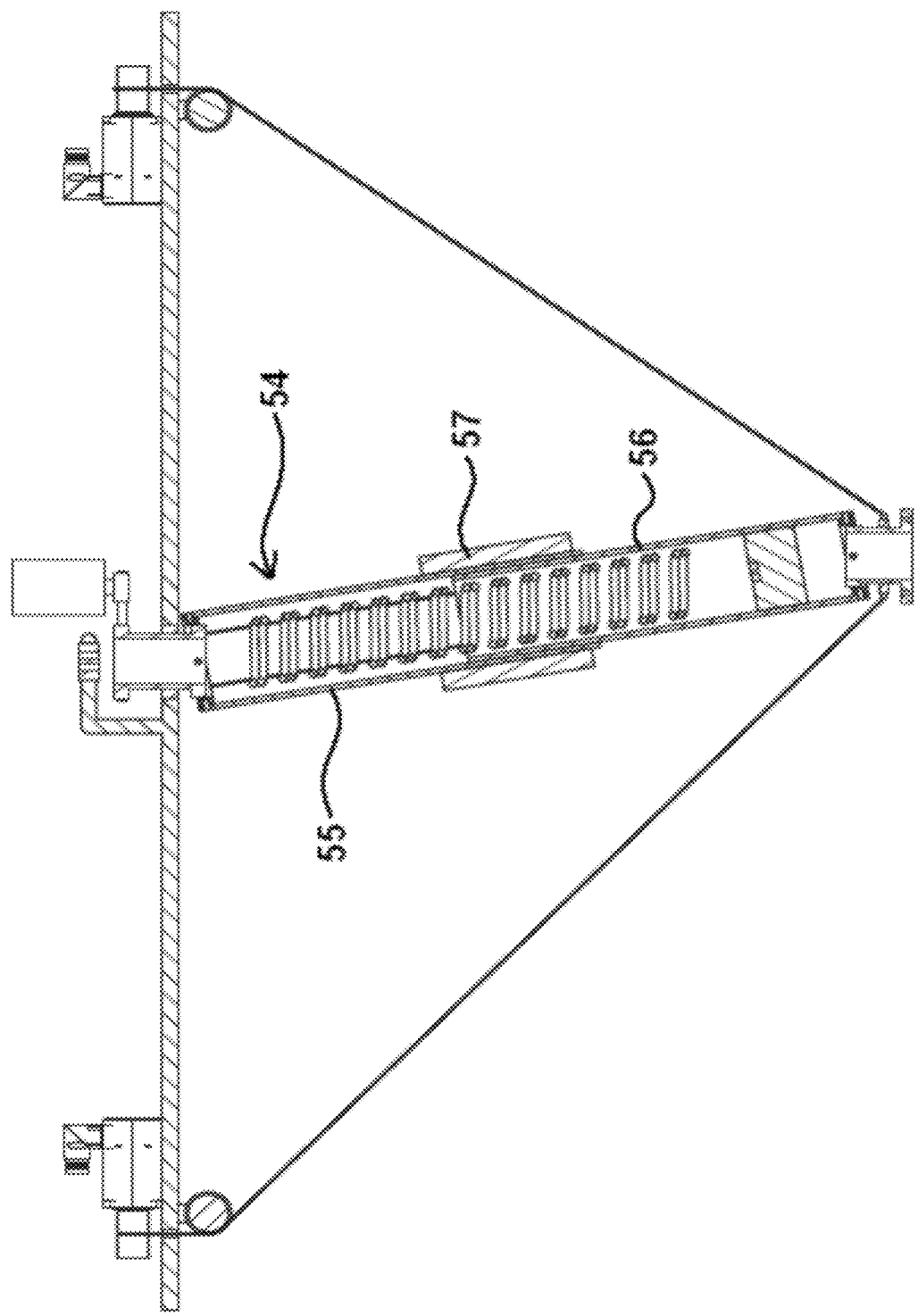

FIG. 11 shows a third exemplary embodiment of an industrial robot in longitudinal section. This exemplary embodiment coincides with the industrial robot according to FIG. 10 apart from the elongated hollow body 54. Only the elongated hollow body is therefore described below. This is embodied as a pneumatic cylinder. The cylinder 55 and the piston rod 56 are embodied as hollow bodies, namely as tubes. The supply lines 51 are arranged inside the cylinder 55 and the piston rod. The pressure for displacing the piston rod in the cylinder is built up and relieved in a chamber 57 surrounding the elongated hollow body on the outside. This is therefore an outer actuator, in contrast to the exemplary embodiment according to FIG. 10.

Figure 12:
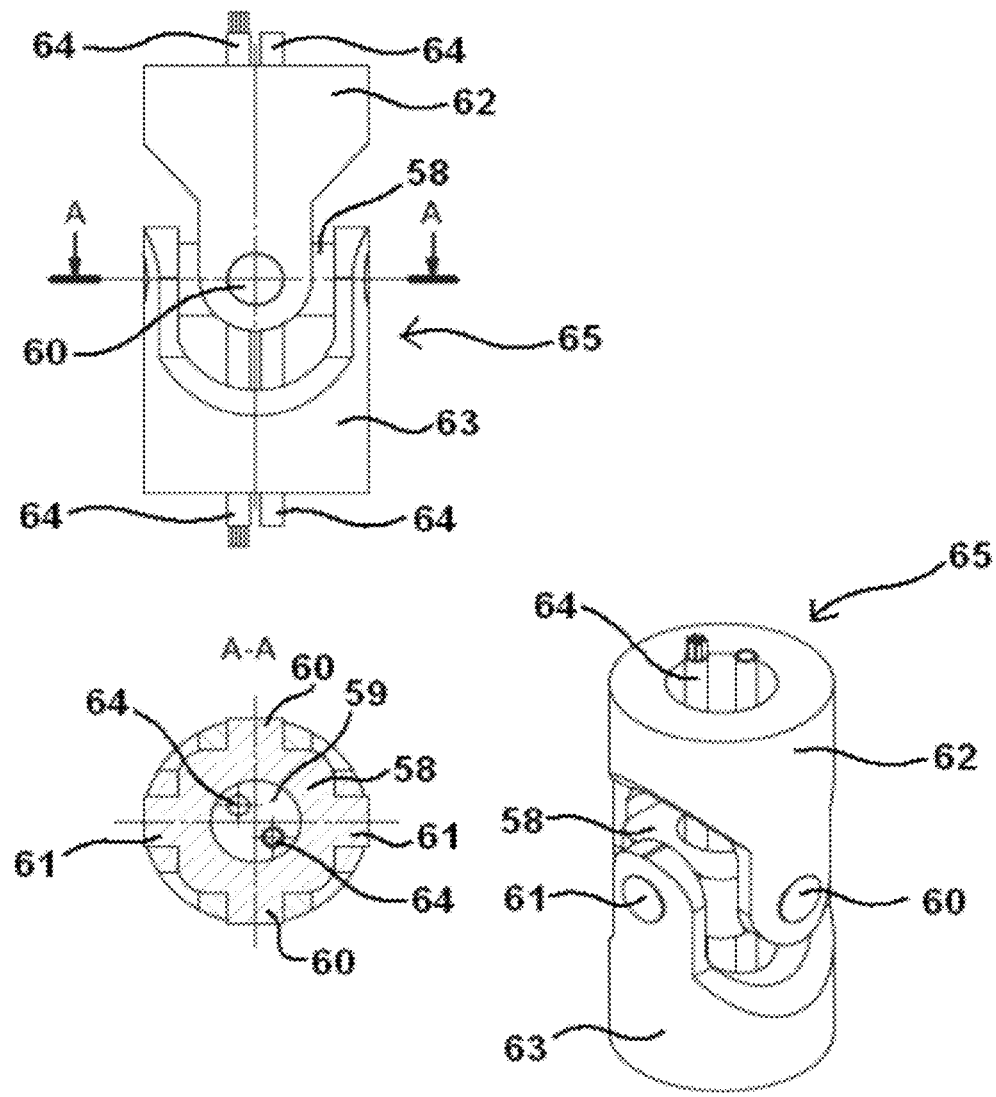

FIG. 12 shows a further exemplary embodiment of a hollow cardan joint for an industrial robot according to FIGS. 1, 9 and 11 in various views. The cardan joint has a central joint part 58, which is equipped with a continuous cavity 59. Two pairs of axle stubs 60, 61 are arranged on the central joint part 58, the rotational axes of which intersect at an angle of 90°. The first pair of axle stubs 60 is rotatably supported in a first joint part 62. The second pair of axle stubs is rotatably supported in a second joint part 63. The first and the second joint part have a continuous cavity with corresponding diameter like the central joint part. The cavities of the three joint parts 58, 62, 63 adjoin one another. Supply lines 64 are arranged in this sequence of cavities. They penetrate the cardan joint from one end to the other. This is discernible in the side view.

Figure 13:
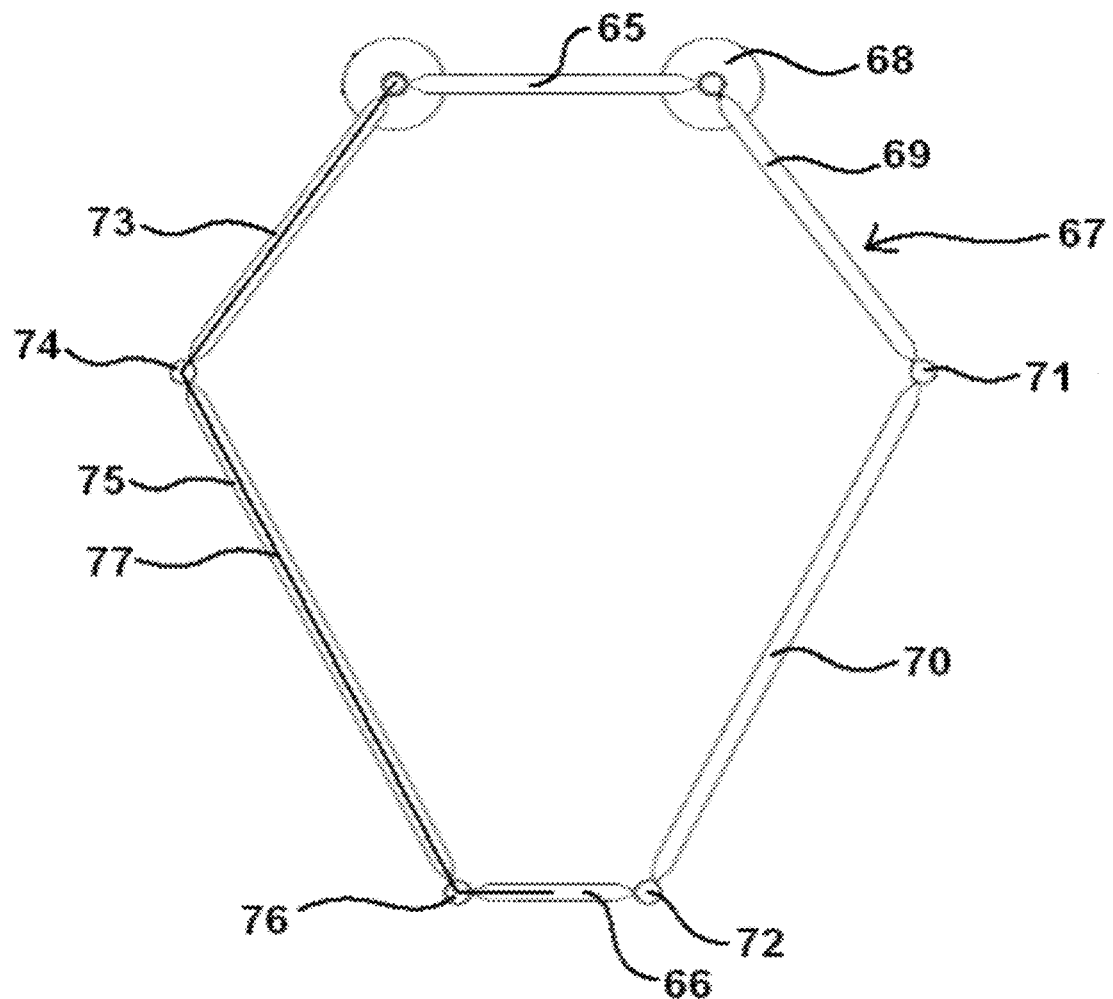

FIG. 13 shows a fourth exemplary embodiment of an industrial robot according to the Delta principle with a robot base 65, a carrier element 66, on which a gripper or a tool can be arranged, and two actuating units 67 embodied as control arms. The gripper and the tool are not shown in the drawing. Each of the three actuating units is driven via a drive unit 68. The actuating units 67 have an upper arm section 69 and a lower arm section 70. The upper arm sections 69 are composed of a hollow body with continuous first cavity 73. The lower arm section 70 has two rods running in a parallel manner, of which only respectively the rod facing towards the viewer can be seen in the drawing. One of the two rods has a continuous third cavity 75. The two rods of the lower arm section 70 of an actuating unit 67 are connected via joints 71 at their upper end to the upper arm section 69 of the actuating unit 67 and via joints 72 to the carrier element 66. The joints 71 coincide at least qualitatively with the joints 72. A joint of this type is shown in FIG. 12. This is a cardan joint. In this context we refer to the upper description for FIG. 12. Furthermore, in accordance with FIG. 5, the hollow joints can also be composed of several rings which are connected to one another via intersecting axles and to the arm sections or the carrier element.

The hollow joint 71 has a continuous second cavity 74. The hollow joint 72 has a continuous fourth cavity 75. The cavities 73, 74, 75 and 76 of the upper and lower arm sections 69, 70 and the hollow joints 71, 72 adjoin one another and form a continuous channel from the robot base 65 to the carrier element 66. A supply line 77 is arranged in this channel. It extends from the robot base 65 to the carrier element 66.

In the fourth exemplary embodiment shown, both actuating units are embodied in a hollow manner. However, it is sufficient if one of the two actuating elements is hollow.

According to a further advantageous embodiment of the invention, the joint (71, 72) is a constant velocity joint, in which the inner joint part has a cavity. This cavity penetrates the inner joint part completely. A constant velocity joint is well known in the art. A double cardan joint, which is a cardan joint (also called a universal joint) joined to another cardan joint, is a constant velocity joint. Accordingly, two of the hollow cardan joints shown in FIG. 12 joined together with one end of one joined to one end of the other is a constant velocity joint. The cavities of the individual joint parts 58, 62 and 63 adjoin one another in sequence to allow the supply lines 64 to penetrate the individual joints from one end to the other.

All of the features of the invention can be essential to the invention individually as well as in any combination with one another.

| | Reference numbers |
|---|---|
| 1 | Robot base |
| 2 | Carrier element |
| 3 | |
| 4 | Actuating unit |
| 5 | Drive shaft |
| 6 | Motor |
| 7 | Upper arm section |
| 8 | Lower arm section |
| 9 | Rod |
| 10 | Rod |
| 11 | Joint |
| 12 | Joint |
| 13 | Joint head |
| 14 | Ring |
| 15 | Receiving member |
| 16 | Receiving member |
| 17 | Receptacle |
| 18 | Coil spring |
| 19 | Bridge element |
| 20 | Elongated hollow body |
| 21 | Tube |
| 22 | Tube |
| 23 | Ring |
| 24 | Ring |
| 25 | Valve control |
| 26 | Supply line |
| 27 | Axle of the cardan joint |
| 28 | Axle of the cardan joint |
| 29 | Groove |
| 30 | Boss |
| 31 | Rotation drive |
| 32 | First hollow shaft |
| 33 | Second hollow shaft |
| 34 | First cardan joint |
| 35 | Second cardan joint |
| 36 | Actuating unit |
| 37 | Cable |
| 38 | Robot base |
| 39 | Rotation drive |
| 40 | Shaft |
| 41 | Roll |
| 42 | Carrier element |
| 43 | Elongated hollow body |
| 44 | Tube |
| 45 | Tube |
| 46 | First cardan joint |
| 47 | First hollow shaft |
| 48 | Rotation drive |
| 49 | Second cardan joint |
| 50 | Second hollow shaft |
| 51 | Supply line |
| 52 | Pneumatic cylinder |
| 53 | Piston rod |
| 54 | Elongated hollow body |
| 55 | Cylinder |
| 56 | Piston rod |
| 57 | Chamber |
| 58 | Central joint part |
| 59 | Cavity |
| 60 | First pair of axle stubs |
| 61 | Second pair of axle stubs |

-continued

| | Reference numbers |
|---|---|
| 62 | First joint part |
| 63 | Second joint part |
| 64 | Supply line |
| 65 | Robot base |
| 66 | Carrier element |
| 67 | Actuating unit |
| 68 | Drive unit |
| 69 | Upper arm section of the actuating unit |
| 70 | Lower arm section of the actuating unit |
| 71 | Joint between an upper and a lower arm section |
| 72 | Joint between a lower arm section and the carrier element |
| 73 | First cavity |
| 74 | Second cavity |
| 75 | Third cavity |
| 76 | Fourth cavity |
| 77 | Supply line |

The invention claimed is:

1. An industrial robot with parallel kinematics, comprising:
a) a robot base;
b) a carrier element used to receive a gripper or a tool, with several moveable, elongated actuating units, which at their one end are connected to drive units arranged on the robot base and the other end of which is moveably connected to the carrier element;
c) an elongated hollow body, having a continuous cavity, which is moveably connected directly or indirectly to the robot base, with a first hollow joint, having a continuous cavity, with several degrees of freedom, via which the elongated hollow body is moveably connected to the carrier element;
d) the cavity of the first hollow joint adjoins the cavity of the elongated hollow body, wherein the cavity of the elongated hollow body and the cavity of the first hollow joint form a channel from the robot base to the carrier element, with at least one pneumatic or hydraulic or electric or optical supply line for a gripper arranged on the carrier element or a tool arranged on the carrier element, which at least one supply line is guided through the cavity of the elongated hollow body and through the cavity of the first hollow joint from the robot base to the carrier element;
e) a second hollow joint with several degrees of freedom, via which the elongated hollow body is connected to the robot base or a drive arranged on the robot base, and that the supply lines are guided through the second hollow joint;
f) the elongated hollow body has at least two tubes that are displaceable inside one another in a telescoping manner; and
g) the at least one supply line is wound in a screw-shaped or spiral-shaped manner at least in sections in the elongated hollow body.

2. The industrial robot according to claim 1, wherein a drive or an actuator is arranged on the robot base or in the elongated hollow body, which generates a torque or a force, and that the elongated hollow body is embodied as a transmission device, which transmits the force or the torque of the drive or actuator to the carrier element or to a gripper arranged on the carrier element or to a tool arranged on the carrier element.

3. The industrial robot according to claim 2, wherein the carrier element is equipped with a hollow shaft rotatably supported in the carrier element, and that the first hollow joint is connected to the end of the hollow shaft facing towards the elongated hollow body to transmit torques.

4. The industrial robot according to claim 3, wherein the elongated hollow body together with the first hollow joint on its end is embodied as a jointed shaft with length compensation.

5. The industrial robot according to claim 1, wherein the elongated hollow body is embodied as an actuator or as part of an actuator, which generates a force acting in the axial direction of the elongated hollow body, and transmits it to a gripper arranged on the carrier element or to a tool arranged on the carrier element.

6. The industrial robot according to claim 1, wherein at least one pneumatic or hydraulic control element is arranged in the elongated hollow body to actuate a gripper or a tool arranged on the carrier element.

7. The industrial robot according to claim 1, wherein the industrial robot is embodied as a Delta robot, which as actuating units has control arms with respectively one upper and one lower arm section and with joints between the lower arm section and the upper arm section of each control arm on the one hand and between each lower arm section and the carrier element on the other hand.

8. The industrial robot according to claim 1, wherein the first hollow joint and the second hollow joint are each a cardan joint.

9. The industrial robot according to claim 8, wherein the cardan joint has a central joint part formed with first and second pairs of axle stubs with intersecting rotational axes, the central joint part including a central opening, the first and second pairs of axle stubs extending outwardly from the central opening, the first pair of axle stubs is supported in or on a first joint part, and the second pair of axle stubs is supported in or on a second joint part.

10. The industrial robot according to claim 8, wherein the cardan joint has an inner ring diposed within an outer ring, which are rotatably connected to one another via a first pair of axles defining a first diametrical axis, a second pair of axles rotably support the outer ring, the second pair of axles defining a second diametrical axis, the first and second diametrical axes are perpendicular to one another, and the two rings are disposed coaxially with respect to a longitudinal axis of the elongated hollow body.

* * * * *